Jan. 24, 1961 D. E. GARRETT 2,969,275
RECOVERY OF BORON VALUES
Filed Nov. 14, 1958
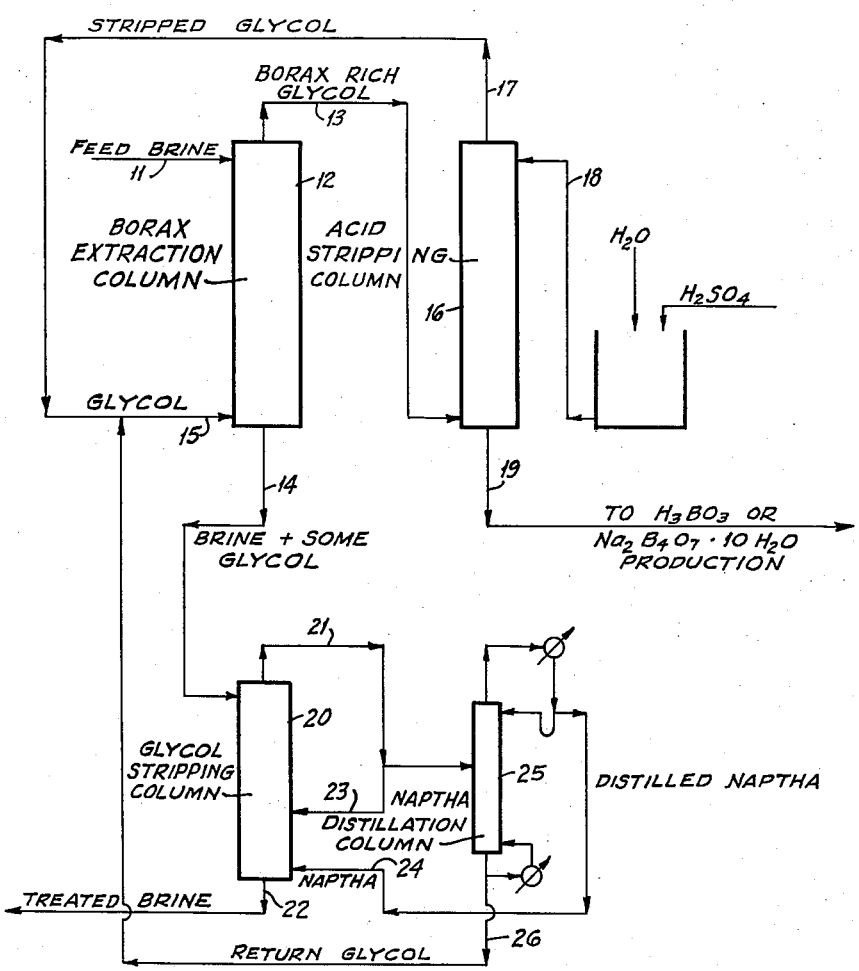
INVENTOR.
DONALD E. GARRETT
ECKHOFF & SLICK
ATTORNEYS
BY
A MEMBER OF THE FIRM

United States Patent Office 2,969,275
Patented Jan. 24, 1961

2,969,275

RECOVERY OF BORON VALUES

Donald Everett Garrett, Trona, Calif., assignor to American Potash & Chemical Corporation, a corporation of Delaware Filed Nov. 14, 1958, Ser. No. 774,059

18 Claims. (Cl. 23—59)

This invention relates in general to the extraction of boron-containing materials from dilute liquors and more particularly to a liquid-liquid extraction process enabling the recovery of such materials as borax from brines or other boron-containing liquors.

Generally, borax and other boron-containing materials are recovered from dilute liquors containing them by evaporation and/or by cooling the liquor so that the boron salt or boric acid crystallizes out of the solution. However, below a limiting boron concentration (and with the complication of other salts), this method is not economical. A more effective method is required.

It is therefore an object of this invention to provide a method for the recovery of boric acid or such boron salts as sodium metaborate, sodium tetraborate or sodium pentaborate from liquors containing such boron-containing materials, said process not being based upon the conventional evaporation and cooling operations.

It is a further object of this invention to provide a method for the recovery of boric acid and various boron salts from liquors containing them by a liquid-liquid extraction process which may be utilized in a continuous fashion in commercial operations.

Other objects and advantages of this invention, if not specifically set forth, will become apparent during the course of the description which follows.

Broadly, this invention is in part the result of the discovery that certain diols, triols and other polyols (some of which are α hydroxy acids or display similar alcohol-adjacent-to electronegative group characteristics) are selective solvents for borax and other boron-containing materials and may be used to extract such materials from liquors, especially highly alkaline liquors, containing them. The particular effectiveness of the various polyols to be listed below stems from the fact that it has been found that certain of these alcohols, while dissolving substantial quantities of boron values, especially borax, are poor solvents for other common inorganic sodium salts customarily found in alkaline brines.

More specifically, it has been found that certain aliphatic diols, triols and other polyols, specifically those of at least a given minimum molecular size and having the OH groups in a planar orientation and on adjacent or once-removed carbon atoms, are particularly effective extractants for boron-containing salts and boric acid while at the same time are relatively poor solvents for such salts as potassium chloride, sodium sulfate, sodium carbonate, sodium chloride, sodium phosphate, sodium sulfide, and other inorganic sodium salts commonly found in brines or waters derived from various natural sources. In addition, the diols, triols and other polyols to which this invention are directed have a low solubility in water and either low melting points (to the extent that they are liquids at normal processing temperatures) or, alternatively, high solubility in certain common organic solvents which are immiscible with the water in which the boron values are dissolved. Thus, they may be used under conditions which are conveniently attained in commercial operation.

The diols, triols and other polyols which may be used fall into several categories. Certain straight and branched-chain (generically termed "open chain" hereinafter) diols and triols (generically termed "polyols" hereinafter) having at least 6 carbon atoms are suitable. Aliphatic diols with short or branch chains containing less than 6 carbon atoms in the chain are too soluble in water and thus difficult to re-extract from the liquor being treated. Of this group of extractants, 1,2-octane-diol is most satisfactory. 2-ethylhexanediol,1,3 is more selective but it is somewhat more difficult to strip the boron values from it. As the number of carbon atoms of the aliphatic diol is increased to 12 and 14, the yield of borax or other boron-containing material recovered is lowered further but the selectivity is better. Apparently this is due to the lower solubility of the long chain compounds. A maximum satisfactory number of carbon atoms is 16 and 8 carbons atoms represents a good working compromise.

In the practice of this invention, the extractant is admixed with the material containing the boron source (generally a brine) and agitated therein until a good contact has been made. Where such a material as 1,2-octane-diol is used, the extractant may be placed in a solution in a carrier, such as petroleum ether, or used alone.

Several methods have been successfully employed for recovering the boron values from the solvent phase. A preferred method to re-extract the boron is by means of contacting the boron-containing solvent with an acid solution, such as dilute $H_2SO_4$. The boron goes to the acid solution, and the solvent is ready for re-use. Other mineral acids may serve as sources of hydrogen ions as, e.g., HCl, $H_3PO_4$, etc.

The boron-polyol complex which is formed where a diol is used is such that two diol molecules may be considered stoichiometric to one boron atom. This is roughly true of other polyols also. The complex usually also incorporates sodium since fairly substantial amounts of sodium will be present in most any solution from which boron values are to be extracted. At least such is true of naturally occurring materials containing boron. In all events, minimum requirements of polyol will thus be seen to depend on the boron analysis of the liquor processed with use of an excess of the extractant being preferred.

Approach 1: The polyol (if it is a liquid) may be contacted directly with the liquor but such is a non-preferred embodiment of the invention, since this would increase the entrainment losses.

Approach 2: A number of solvents for various of the polyols have been discovered. Among these are benzene, isopropyl ether, diethyl ether, petroleum ether, methylethyl ketone and the alcohols.

Intensive studies were made of 2-ethylhexanediol,1,3 as an extractant. Selectivity using this material is very good, little chloride, carbonate or sulfate being extracted and up to 95% of the boron in a brine of the type described above being removed with a three-stage extraction.

Petroleum ether was found to be an excellent carrier for the 2-ethylhexanediol-1,3.

Examples of the process as carried out on a laboratory scale are set forth below. They are for illustrative purposes only and are not to be interpreted as imposing limitations on the scope of the invention other than as set forth in the appended claims.

*Example I.*—A quantity of 100 ml. of brine containing 1.19% borax, about 5% KCl, about 4% $Na_2CO_3$, about 6% $Na_2SO_4$, about 0.1–0.15% $Na_2S$ and $Na_3PO_4$, about 0.05% $Na_3AsO_4$ and about 19% NaCl was shaken for 1 minute with a 50 volume percent mixture of 2-ethylhexanediol-1,3 and petroleum ether. The two phases were separated. The $Na_2B_4O_7$ content of the aqueous liquor was reduced from 1.19% to 0.17% while the solvent phase contained 2.50% $Na_2B_4O_7$, corresponding to a 95.1% extraction. The boron was then extracted from the solvent phase with 2 N $H_2SO_4$.

Throughout most of the discussion above, attention has been directed to the use of reverse stripping by dilute acid solution, the preferred method. In some instances, the solvent may be evaporated from the boron, or in other cases the ester may be distilled from the solvent. Also, the boron may be salted out by means of a new solvent or with a soluble salt. Finally, the boron may be removed from the aqueous layer if the boron-and-water-saturated solvent can be made to form two phases by a temperature change. Other methods may also be used to recover the boron values from the solvent, depending upon the end product desired and the solvent used. After removal of borax the solvent may be re-used and contacted again with the brine.

Attention heretofore has been directed to a limited number of extractants and in the table below, a list of those which are especially suitable has been set forth.

TABLE A

| Compound | Extraction Coefficient [1] |
|---|---|
| 1,2-octanediol | 0.8 |
| 2-ethyl-2-butyl-1,3-propanediol | 6.5 |
| 2,2,4-trimethyl-1,3-pentanediol | 5 |
| 2-ethyl-1,3-hexanediol | 10 |
| 3,4-di-ethyl-3,4-hexanediol | 10 |
| 1,2,6-hexanetriol | 10 |

[1] Wt. percent $Na_2B_4O_7$ in solvent/Wt. percent $Na_2B_4O_7$ in brine.

The extraction coefficients set forth above were those obtained in work on what is designated as "carbonation plant end liquor" (CPEL) which is a material containing about 1.2% $Na_2B_4O_7$ and a variety of other salts, including KCl, $Na_2CO_3$, $Na_2B_4O_7$, $Na_2SO_4$, $Na_2S$, $Na_3PO_4$, $Na_3AsO_4$ and NaCl, together with about 65% $H_2O$. Where these various extractants are tested against varying types of liquors containing varying quantities of each of these ingredients and, of course, some quantity of boron values, it has been found that there is no interference with any constituent (or alkalinity) that is present in any of these liquors. Consequently, analysis of the major salts shown in the various tables have been included only to provide examples.

Throughout this discussion, attention has been directed primarily to the recovery of boron values in the form of borax. As stated earlier, various other boron-containing materials such as sodium metaborate, sodium pentaborate and boric acid may be treated.

In Table B set forth below, data appears showing the extraction of borax from carbonation plant end liquor by several of the solvents listed earlier. In Table C immediately following, data appears for the extraction of borax from carbonation plant end liquor by a double solvent system.

TABLE B

*Borax extraction from carbonation plant end liquor (CPEL) with aliphatic diols*

B-1. EXTRACTION WITH 2-ETHYL-1,3-HEXANEDIOL AT 20° C.

Ratio of CPEL to diol by volume __ 3.
Diol:
  Melting point __ −40° C. (sets to glass).
  Boiling point __ 243.1° C.
  Solubility at 20° C.—
    Diol in water __ 4.2% by weight.
    Water in diol __ 11.7% by weight.

| | CPEL | 1st Extract. | | 2nd Extract. | | 3rd Extract. | | Solvent Used |
|---|---|---|---|---|---|---|---|---|
| | | Aq. Ph. | Solv. | Aq. Ph. | Solv. | Aq. Ph. | Solv. | |
| NaCl __percent__ | 19.37 | 19.39 | 0.05 | 19.58 | 0.12 | 19.75 | 0.15 | 0.0 |
| $Na_2SO_4$ __do__ | 6.03 | 6.70 | 0.00 | 6.71 | 0.02 | 6.71 | 0.03 | 0.01 |
| $Na_2CO_3$ __do__ | 3.64 | 3.72 | −0.47 | 3.74 | −0.04 | 3.78 | 0.01 | 0.00 |
| $Na_2B_4O_7$ __do__ | 1.20 | 0.35 | 3.35 | 0.15 | 0.92 | 0.07 | 0.25 | 0.00 |
| Wt. percent $Na_2B_4O_7$ of total solids | 3.96 | 1.16 | 98.5 | 0.52 | 86.8 | 0.23 | 56.8 | |
| $Na_2B_4O_7$ dist. coefficient, K | | 9.6 | | 6.1 | | 3.6 | | |

B-2. EXTRACTION WITH 2-ETHYL-2-BUTYL-1,3-PROPANEDIOL AT 60° C.

Ratio of CPEL to diol by volume __ 3.75.
Diol:
  Melting point __ 40.1° C
  Boiling point __ 130° C. (5 mm.)
  Solubility at 50° C.—
    Diol in water __ 1.4% by weight.
    Water in Diol __ 11.7% by weight.

| | CPEL | 1st Extract. | | 2nd Extract. | | 3rd Extract. | | Solvent Used |
|---|---|---|---|---|---|---|---|---|
| | | Aq. Ph. | Solv. | Aq. Ph. | Solv. | Aq. Ph. | Solv. | |
| NaCl __percent__ | 19.03 | 19.32 | 0.23 | 19.63 | 0.33 | 19.96 | 0.39 | −0.04 |
| $Na_2SO_4$ __do__ | 6.03 | 6.18 | 0.00 | 6.31 | 0.00 | 6.44 | 0.00 | 0.00 |
| $Na_2CO_3$ __do__ | 3.63 | 3.54 | 0.70 | 3.52 | 0.36 | 3.55 | 0.15 | 0.02 |
| $Na_2B_4O_7$ __do__ | 1.19 | 0.37 | 2.39 | 0.11 | 0.72 | 0.06 | 0.13 | 0.07 |
| Wt. percent $Na_2B_4O_7$ of total solids | 3.98 | 1.26 | 71.8 | 0.37 | 48.9 | 0.20 | 10.3 | |
| $Na_2B_4O_7$ dist. coefficient, K | | 6.5 | | 6.5 | | 2.2 | | |

TABLE B—Continued
Borax extraction from carbonation plant end liquor (CPEL) with aliphatic diols
B-3. EXTRACTION WITH 2,2,4-TRIMETHYL-1,3-PENTANEDIOL AT 60° C.

Ratio of CPEL to diol by volume ............................................................. 1.25.
Diol:
    Melting point ............................................................................. 49°–51° C.
    Boiling point ............................................................................. 109°–111° C. (4 mm.).

| | CPEL | 1st Extract. | | 2nd Extract. | | 3rd Extract | | Solvent Used |
|---|---|---|---|---|---|---|---|---|
| | | Aq. Ph. | Solv. | Aq. Ph. | Solv. | Aq. Ph. | Solv. | |
| NaCl ............ percent.. | 19.14 | (¹) | 0.18 | 20.29 | 0.25 | 22.64 | 0.26 | 0.01 |
| Na₂SO₄ ............ do .... | 6.03 | (¹) | | no sulfates determined | | | | |
| Na₂CO₃ ............ do .... | 3.61 | (¹) | | 2.13 | | 1.92 | 0.01 | 0.23 |
| Na₂B₄O₇ ............ do .... | 1.21 | (¹) | 1.19 | 0.03 | 0.14 | 0.03 | 0.03 | 0.02 |

¹ Sample spoiled by analyst.

TABLE C
Borax extraction from carbonation plant end liquor with mixtures of 2-ethyl-1,3-hexanediol and petroleum ether at 20° C.

Ratio of CPEL to Solvent Mixture: 1
Solvent Mixtures Used:
    A. Diol, 25%; ether, 75%
    B. Diol, 50%; ether, 50%
    C. Diol, 75%; ether, 25%
    D. Diol, 90%; ether, 10%

| | CPEL | Solv. Mix. A | | Solv. Mix. B | | Solv. Mix. C | | Solv. Mix. D | |
|---|---|---|---|---|---|---|---|---|---|
| | | Aq. Ph. | Solv. | Aq. Ph. | Solv. | Aq. Ph. | Solv. | Aq. Ph. | Solv. |
| NaCl ............ percent.. | 19.04 | 19.21 | 0.05 | 19.49 | 0.06 | 19.56 | 0.08 | 19.78 | 0.12 |
| Na₂SO₄ ............ do .... | 6.03 | | 0.00 | | 0.00 | | 0.00 | | 0.00 |
| Na₂CO₃ ............ do .... | 3.78 | 3.63 | 0.07 | 3.70 | 0.07 | 3.74 | 0.06 | 3.80 | 0.03 |
| Na₂B₄O₇ ............ do .... | 1.19 | 0.24 | 0.83 | 0.17 | 2.50 | 0.15 | 1.52 | 0.15 | 1.37 |
| Wt. percent Na₂B₄O₇ of total solids ............ | 3.96 | | 87.4 | | 95.1 | | 96.1 | | 90.1 |
| Na₂B₄O₇ dist. coefficient, K ... | | 3.5 | | 14.7 | | 10.1 | | 9.1 | |

The drawing is a block diagram indicating the nature of the general process for recovering boron values from a typical naturally derived brine-containing material using an organic polyol. Feed brine 11, or other boron-containing liquor, is introduced into an extraction column 12 (or any other type of liquid-liquid extraction equipment; this pertains to columns 16 and 20), and is allowed to contact the solvent 15 (designated "glycol" here) in a countercurrent manner. The "brine" leaves the column at 14 essentially stripped of its boron content, but still containing a small amount of the polyol solvent. To recover this solvent, the brine is fed into an extraction column 20 where it is contacted in a countercurrent manner with a stream of pure stripping solvent 24 (designated "naptha" here) and of recycled, partially loaded solvent 23. The brine leaving at this point 22 is essentially borax-and solvent-free.

The glycol-laden, second solvent 21 is partially recycled 23 to increase its glycol content, and partially distilled in a fractionating column 25. The distillate 24 is sent to the bottom of the glycol stripping tower 20 while the glycol bottoms 26 are returned to the borax extraction tower 12.

The borax-rich glycol 13 from the borax extraction column 12 is sent to the bottom of a borax stripping (extraction) column 16 where a dilute stream of sulfuric acid 18 extracts the borax from the glycol. The stripped glycol 17 is then sent to the borax extraction column 12 for re-use. The acid solution of borax 19 is sent to conventional equipment for the recovery of borax, boric acid, or other borate salts.

The continuous process described above was conceived with the specific preferred reactant, 1,2-octanediol, in a petroleum ether solution, in mind, but the process is readily adapted for use with other extractants.

Naptha has been shown as the stripping solvent in the process described above. Another preferred stripping solvent is petroleum ether. A large number of other solvents are suitable, it being kept in mind that the solvent should be water-immiscible, should have a good dissolving capacity for the polyol, and, preferably, should have a boiling point such that it can easily be stripped by distillation from the polyol using moderate steam pressures and, in the condensers, moderate cooling water temperatures.

Obviously, many modifications and variations may be made without departing from the spirit and scope of this invention and therefore only such limitations should be imposed as are indicated in the appended claims.

I claim:

1. A process for the recovery of boron values from an alkaline aqueous solution containing such boron values in the form of at least one material selected from the class consisting of borax, sodium pentaborate, sodium metaborate and boric acid comprising: adding to said alkaline solution at least one open chain aliphatic polyol selected from the class consisting of diols and triols having 6 to 16 carbon atoms in the aliphatic chain, whereby to form a boron-rich solvent layer and a separate aqueous layer; separating the two layers so formed; and acidifying said boron-rich solvent layer whereby to cause said boron values to separate from said polyol.

2. The process of claim 1 wherein the polyol is 2-ethylhexanediol-1,3.

3. The process of claim 1 wherein the polyol is 2-ethyl-2-butyl-1,3-propanediol.

4. The process of claim 1 wherein the polyol is 1,2-octanediol.

5. The process of claim 1 wherein the polyol is 2,2,4-trimethyl-1,3-pentanediol dissolved in octanol.

6. The process of claim 1 wherein the polyol is 3,4-diethyl-3,4-hexanediol.

7. The process of claim 1 wherein the polyol is 1,2,6-hexanetriol.

8. A process for the recovery of boron values from aqueous alkaline liquors containing such boron values in the form of at least one material selected from the group consisting of borax, sodium pentaborate, sodium metaborate and boric acid comprising: adding to said alkaline liquor at least one open chain aliphatic polyol selected from the class consisting of diols and triols having between 6 and 16 carbon atoms in the aliphatic chain; agitating the liquor to contact said polyol in said alkaline liquor whereby to form a boron-polyol complex, said complex forming one phase and the remaining aqueous liquor forming a second phase containing small amounts of polyol; separating the phases; acidifying the boron-solvent complex so formed whereby to break the complex; and thereafter stripping said polyol from the second phase and from said acid treated solution so formed by contacting each with a water-immiscible organic solvent for said polyol whereby to form solutions substantially free of said polyol.

9. The process of claim 8 wherein the acid is at least 1N sulfuric acid.

10. The process of claim 8 wherein the polyol is 2-ethylhexanediol-1,3.

11. The process of claim 8 wherein the polyol is 2-ethyl-2-butyl-1,3-propanediol.

12. The process of claim 8 wherein the polyol is 1,2-octanediol.

13. The process of claim 8 wherein the polyol is 3,4-di-ethyl-3,4-hexanediol.

14. The process of claim 8 wherein the polyol is 1,2-octanediol in a petroleum ether carrier, sulfuric acid is used as the acidifying agent, and the stripping agent for the polyol is petroleum ether.

15. The process of claim 1 wherein the polyol is a 1,2-glycol.

16. The process of claim 1 wherein the polyol is a 1,3-glycol.

17. The process of claim 8 wherein the polyol is a 1,2-glycol.

18. The process of claim 8 wherein the polyol is a 1,3-glycol.

References Cited in the file of this patent
UNITED STATES PATENTS
2,813,838    Lyman et al.   ----------- Nov. 19, 1957